United States Patent [19]

Koch et al.

[11] Patent Number: 4,530,761

[45] Date of Patent: Jul. 23, 1985

[54] EXTRUSION DEVICES

[75] Inventors: Klaus Koch, Laatzen; Rainer Klaus, Hanover; Gerhard Syrbiüs, Grossburgwedel; Hans-Joachim Schaeffer, Laatzen, all of Fed. Rep. of Germany

[73] Assignee: Hermann Berstorff Maschinenbau GmbH, Hanover, Fed. Rep. of Germany

[21] Appl. No.: 591,570

[22] Filed: Mar. 20, 1984

[30] Foreign Application Priority Data

Mar. 23, 1983 [DE] Fed. Rep. of Germany ....... 3310485

[51] Int. Cl.[3] .............................................. B01D 29/00

[52] U.S. Cl. .................................... 210/407; 210/415; 100/117

[58] Field of Search ............... 210/405, 413, 414, 415, 210/407; 100/107, 108, 117

[56] References Cited

U.S. PATENT DOCUMENTS 689,440 12/1901 Tuska .................................. 210/415
2,105,782 1/1938 Fauth .................................. 210/405
4,287,058 9/1981 Larsen ................................ 210/415
4,384,955 5/1983 Nakakura ............................ 210/415
4,470,904 9/1984 Gail ..................................... 210/415

*Primary Examiner*—John Adee
*Attorney, Agent, or Firm*—Schwartz, Jeffery, Schwaab, Mack, Blumenthal & Evans

[57] ABSTRACT

An extrusion device used for extracting liquids from liquid-solid mixtures and which operates on the separation gap principle, comprising a screw rotating in a barrel. Pins project radially inwardly into the barrel. The separation gaps and the internal lining of the barrel are maintained in an operationally efficient state for long periods of time even if highly abrasive and/or corrosive mixtures are being treated. The internal surface of the hollow barrel is lined with individual, interchangeable segments which are peripherally staggered relative to one another in the form of a wall, end face or tip portions are located on the end portion of the pins. Moreover, the screw comprises a mandrel on which are mounted individual screw flight portions. Between the flight portions, ring portions are mounted on the mandrel. These ring portions and the tip portions mounted on the pins define the separation gaps. Accordingly, those parts which are liable to wear or corrode can be readily replaced.

8 Claims, 4 Drawing Figures

EXTRUSION DEVICES

FIELD OF THE INVENTION

The present invention relates to an extrusion device and, more particularly, to an extrusion device which is used for extracting liquid components from liquid-solid mixtures.

DESCRIPTION OF THE PRIOR ART

Extrusion devices suitable for extracting liquid components from liquid-solid mixtures are known. In such arrangements, the device comprises a hollow cylinder or barrel which has a feed aperture for the mixture to be separated and a discharge aperture for the separated solid material. A delivery screw rotates within the barrel and has at least one conveying flight helically disposed around a substantially cylindrical core. In some known arrangements, pins project radially inwardly into the interior of the barrel. The flight or flights of the screw are discontinuous, the gaps formed therein permitting the screw to rotate without striking the pins. Separation gaps are formed between the tips or innermost ends of the pins, which may be rounded so as to correspond to the shape of the screw core, and the base or core of the screw for extracting the liquid from the mixture. The separation gaps are very small and, in practice, are usually between 0.1 and 0.8 mm. The pins have axially extending discharge bores formed therein, the bores being connected to a drainage or discharge conduit for removing the extracted liquid from the press. German Offenlegungsschrift No. 3 046 383 discloses an extrusion device of the above-mentioned known type.

Such liquid extraction devices which include separation gaps have not, hitherto, been mechanically capable of achieving dry substance(DS) contents of up to 90% if for example, an attempt is being made to extract liquid from fibrous sludges encountered in the paper-making industry or from such material as tree bark.

When liquid is being extracted from dirty or contaminated materials, considerable problems of wear of the various parts of the extrusion device arise if sand or other similar abrasive solid materials are present. Moreover, if an attempt is being made to extract liquid from tree bark, not only do considerable wear problems arise but there are also serious problems of corrosion caused by acids released from the bark during the extraction process.

Since liquid extraction devices which have separation gaps can operate at very high pressures (up to 500 bars) and at relatively high temperatures (up to 100° C.), it is also possible to extract and remove the inter-cellular water contained in, for example, tree bark. This further enhances the dry-substance content value.

Liquid extraction devices of the above-mentioned type having separation gaps also offer the distinct advantage that once the liquid has been removed from the mixture, it can be discharged from the device substantially at the location where it is separated from the mixture, that is to say, in front of the stationary pins which extend into the hollow barrel. By so doing the liquid cannot re-mix, to any appreciable extent, with the solid components. Because of the prevailing pressure drop, the extracted liquid, when viewed in the direction of feed of the mixture, flows from in front of the pins to behind the pins and thence to the pin heads and into the bores formed in the pins.

The drop in pressure from a point in front of the retaining pins to the pin bores may be from as high as 500 bars to atmospheric pressure. Accordingly, the extracted liquid can, and indeed does, flow out of the device very rapidly in a friction-free manner without permitting the liquid to re-mix with solid components to any appreciable extent.

As the solid-liquid mixture passes through the device, more and more liquid is extracted and removed, which means that the material remaining in the device is more solid. The pressure within the barrel can, therefore be gradually subjected to higher and higher pressures. The constant and immediate discharge of the extracted liquid therefore makes it easier to attain a high pressure of up to 500 bars and is, therefore, a pre-requisite for achieving high dry-substance contents. This, hithereto, has not been possible using other known mechanically-operating devices.

Because of the very small size of the separation gaps, however, the extraction devices are somewhat difficult to control. In general, the device will only operate satisfactorily, without becoming blocked if certain gap thickness tolerances are observed.

The separation gaps are naturally self-cleaning. This is due to the relative movement between the stationary heads or tips of the pins and the rotating screw core. Solid particles which enter the gap are pulverised and discharged, together with the liquid, through the axial bore in the pin. This self-cleaning effect, and hence the operational efficiency of the device, can only be maintained if a pre-determined size of the gap is not exceeded. When this dimensioning, which is dependent upon the material being treated, is exceeded, an excessive number of solid particles find their way into the axial bore in the pin. The bore thus becomes partially or wholly blocked which, naturally, adversely affects the efficient operation of the device to a considerable extent.

It is therefore particularly important that the desired gap size is maintained despite the problems of corrosion and wear which may arise.

On the other hand, the problems of corrosion and wear are aggrevated considerably by very high pressures and high temperatures. When the pre-selected separating gap size, allowing for tolerances, is exceeded due to corrosion and/or wear, the dry substance content of the material which has been extracted immediately drops. In turn, this means it is no longer possible to build up such a high pressure in the barrel because the liquid content of the mixture has increased due to the reduced efficiency of the extraction.

OBJECTS OF THE INVENTION

The present invention seeks to provide an extrusion device for extracting liquids from liquid-solid mixture, the device being provided with separation gaps, but which remains operable even if mixtures which normally cause considerable corrosion and wear problems are extracted. In other words, the present invention seeks to provide a device in which the size of the separation gap and the interior of the barrel are only insignificantly impaired by corrosion and/or wear.

BRIEF SUMMARY OF THE INVENTION

According to the present invention, there is provided an extrusion device for separating liquids from liquid solid mixtures comprising a cylinder or barrel, which is provided with a feed aperture for the liquid-solid mixture and a discharge outlet for the material from which the liquid has been removed, a screw rotating in the barrel, the screw having at least one flight helically disposed therearound, the at least one flight being discontinuous and having gaps formed therein, radially extending pin members projecting into the interior of the barrel, the gaps in the at least one flight on the screw being so dimensioned as to permit the screw to rotate past the pins, separation gaps being defined between the tips of the retaining pins and the core of the screw thread, the gaps in use, being substantially self-cleaning, the retaining pins having axial discharge bores formed therein for the extracted liquid, the bores being connected to a drainage or discharge system, wherein the internal surface of the barrel is lined with individual ceramic segments which are disposed relative to one another in the form of a wall, the pins each have an interchangeable axially bored end face or tip portion disposed thereon the axial bore in the tip portion being aligned with the axial bore in the pin and wherein the screw comprises a mandrel having a plurality of screw flight portions mounted thereon, at least one ring member being spring-mounted on the mandrel and being disposed between adjacent flight portions, the ring portions forming the core of the screw and the separation gaps being defined between the tip portions mounted on the pins and the ring portions.

As explained hereinbefore, extrusion devices including separation gaps are not normally operated at a pressure of up to 500 bars, nor do they achieve liquid extraction efficiently enough to produce up to 95% dry substance content. However, in these extreme conditions, corrosion occurs and wear problems which do not occur under milder conditions manifest themselves.

However, in the present invention, by lining the hollow barrel with individual, interchangeable segments, and simultaneously making the parts defining the separation gaps, that is to say, the tips of the pins and the core of the screw, also interchangeable, these problems are overcome or at least minimized.

Any wear which occurs can thus be rectified simply by replacing the worn part. It is therefore, no longer necessary for an entire hollow barrel or new, bored, liquid extraction pins to be replaced if wear or corrosion occurs. In this connection, the interchangeable nature of the screw thread core which, in the device of the invention, is in the form of a plurality of interchangeable rings and which, together with the pin heads, form the liquid extracting separation gaps has proved to be particularly important. In this context, high liquid extraction values up to 90% dry content, can only be maintained if the separation gap size does not exceed a certain limit value, and it will be readily appreciated that wear and corrosion both affect the size of the gap. The interchangeability of the parts most likely to wear and corrode means that the gap size can, in a simple manner, be maintained below the limit value. The end face portions of the liquid extraction pins can be readily replaced once the detachably affixed pins have been removed from the barrel.

The rings can be readily replaced by disassembling the screw and then removing the individual screw segments and the rings from the continuous mandrel. The lining of the barrel is in the form of segments built up in the form of a wall. This means that the barrel itself is protected and also means that, if the lining corrodes or wears, the appropriate segment is all that needs to be replaced. Thus, all of the major operational components of the device of the present invention are readily interchangeable and are relatively simple to dismantle, which means that such interchange only causes a brief interruption to the operation of the device.

In order to extend the service-life, and hence the time intervals between the interchange or replacement of individual components, it is desirable if the end face or tip portions located on the pins and the ring portions forming the core of the screw are each formed of a hard metal produced by sintering or from a ceramics material. The sintered hard metal is advantageously tungsten carbide.

The tip portions of the liquid extraction pins are preferably formed from tungsten carbide produced by a sintering process, so that even these intensely-stressed portions have very long service-lives. The ring portions which, together with the tip portions of the pins form liquid extraction separation gaps are also desirably produced by sintering from, for example, tungsten carbide or a ceramics material such as a zinc oxide ceramics material. This provides the joint advantages that not only are very long service-lives of the pins and the screw core achieved but also that the liquid extraction separation gaps are operationally maintained at their desired sizes for a long period of time. These economically viable service-lives have been achieved by the device of the present invention whilst simultaneously achieving a high degree of liquid extraction of up to 90% dry substance content.

When removing liquid from tree bark, for example, pins hithereto have only had a service-life of a few weeks. Similarly, the core of the screw, which forms the separation gaps with the tips of the pins had only a short service-life. Within a few weeks, a separation gap originally set at 0.1 mm became a gap of 10 mm. The axial bores in the pins therefore became obstructed by solid particles and no further liquid was discharged from the system. The dry substance content immediately dropped considerably and, because of the relatively high percentage of liquid remaining in the mixture it was only possible to achieve a totally unsatisfactory build-up of pressure in the downstream portion of the barrel.

Such serious disadvantages have, effectively, been eliminated by the device of the present invention. In fact, it has been found that, even under the most extreme conditions such as, for example, when attempting to remove liquid from tree bark which is considerably contaminated with sand, there is virtually no corrosion and very little wear, even after the machine has been running for several months.

The very small gaps of the order of 0.2 mm between the tips of the pins and the screw core which are required for efficient extraction are maintained so that the separation gaps remained fully operational, a high pressure is built-up in the barrel and dry substance contents of up to 90%, depending on the material being extracted, are achieved.

It must be stressed that, by lining the internal surface of the barrel with ceramics material, this operational component part of the machine, which is subject to high wear and high corrosion, is particularly well protected.

In a preferred embodiment the segments forming the lining on the internal surface of the barrel are formed of a hard metal or a ceramics material, each segment having a semicircular groove formed in the face thereof which, in use, lies adjacent the barrel, a plurality of semi-circular axially-extending grooves being formed in the internal surface of the barrel, the grooves in the segments and in the barrel being aligned with one another so as to define a plurality of axially extending channels which are substantially circular in cross-section, circular section metal bars or rods being located in the circular-section channels defined by the two semi-circular grooves to prevent the ceramic segments from rotating with respect to the barrel. This ensures that the segments can neither rotate with the screw nor be carried along thereby. Such a measure also permits the segments to be easily assembled and disassembled. Furthermore, the individual segments are thus detachably connected to the internal wall of the barrel.

In order to ensure that the individual segments are keyed to one another, it is particularly advantageous if one of the faces of each of the segments adjacent the face provided with the semi-circular groove is itself provided with a longitudinally extending groove which is substantially semi-circular in cross-section, the other of the adjacent faces being provided with a semi-circular projection portion, the additional groove and the projection portion being so dimensioned as to co-operate with, respectively, the projection portion and the additional groove of adjacent segments such that adjacent segments are keyed together.

It is desirable if aluminium oxide ceramics material is used for forming the segments since this appears to give the optimum service-life to the barrel lining.

BRIEF DESCRIPTION OF THE DRAWINGS

One embodiment of the present invention will be further described, by way of example, with reference to the accompanying drawings, in which.

DESCRIPTION OF PREFERRED EMBODIMENT

Figure 1:
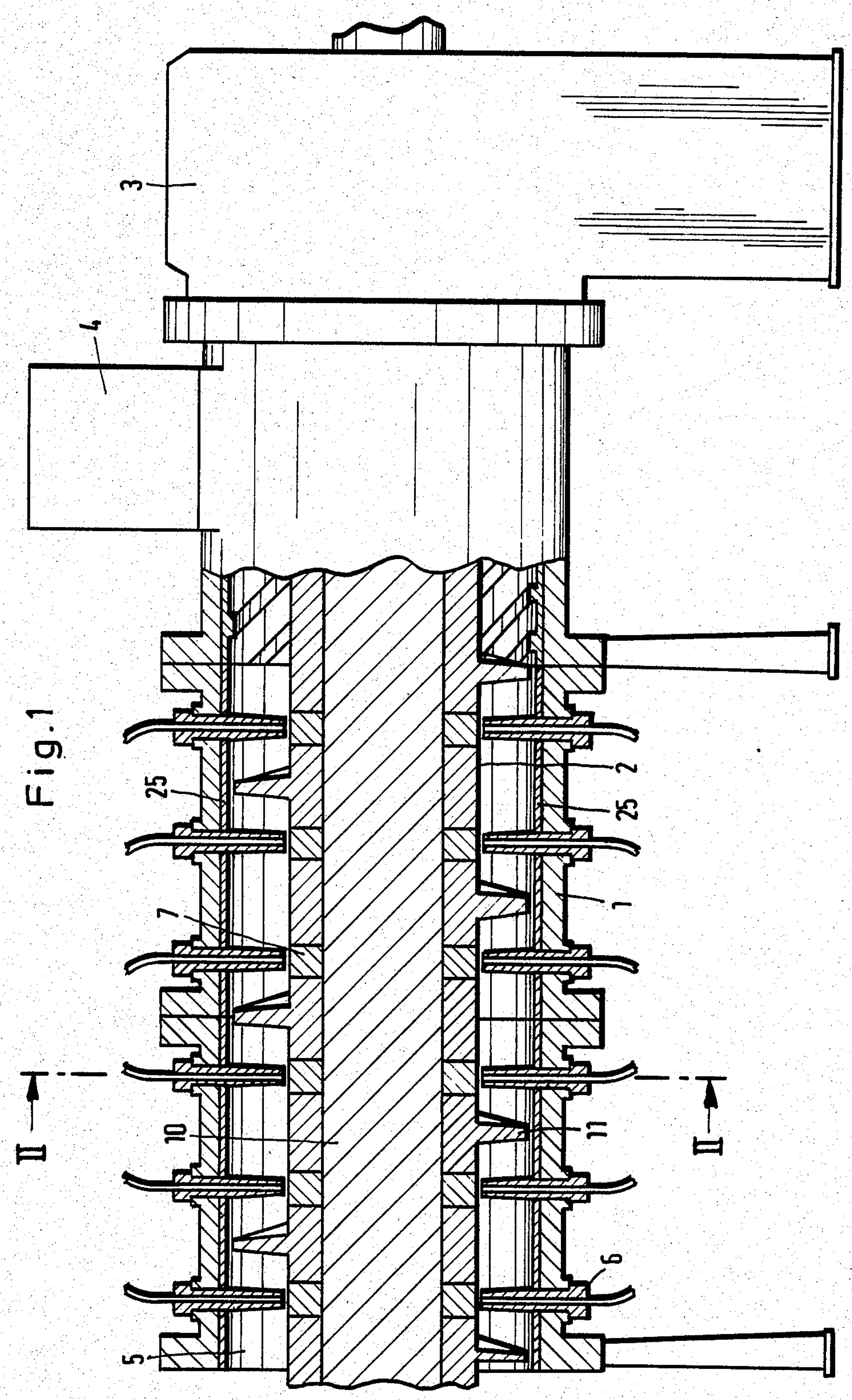
FIG. 1 is a longitudinal sectional view through a liquid extraction device in accordance with the present invention.

In the drawings, there is shown a liquid extraction device which comprises a hollow barrel 1, in which a delivery screw 2 rotates. The delivery screw 2 is caused to rotate by drive means 3 which are not shown in detail. A liquid-solid mixture is introduced into the device through a material hopper 4, and solid matter from which liquid has been extracted is discharged from the device through annular apertures 5.

Figure 3:
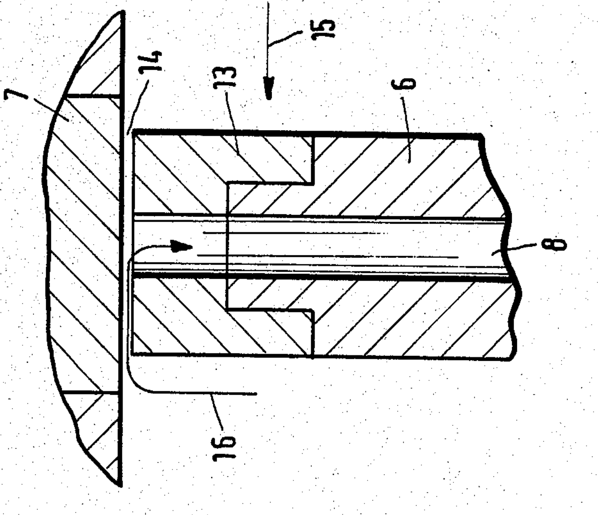
FIG. 3 is a cross-sectional view through a detail of the device shown in FIG. 1 and shows a separation gap defined between a barrel and a pin.
Figure 2:
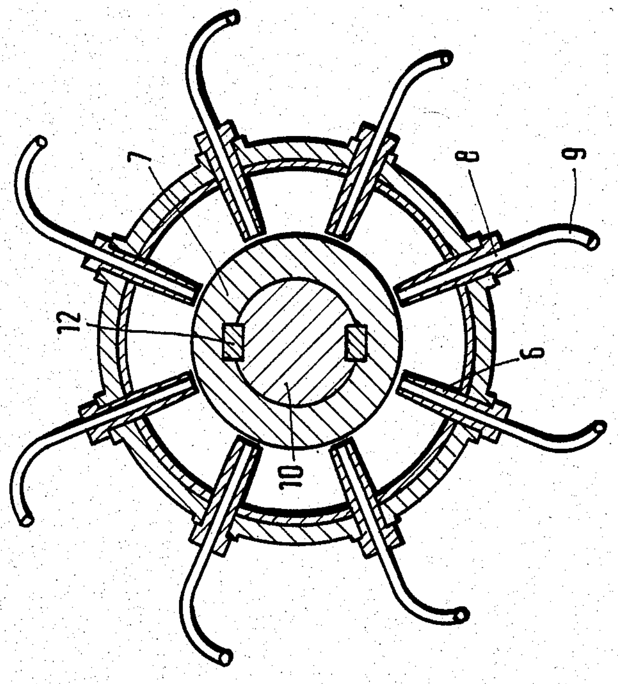
FIG. 2 is a cross-sectional view taken along the line II—II of FIG. 1.

Liquid extraction pins 6 having axial bores 8 formed therein, best seen in FIGS. 2 and 3, project radially inwardly into the interior of the barrel 1. Drainage conduits 9 are connected to the bores 8 for the removal of liquid from the device. In use, the liquid is separated from the solid components of the mixture in the barrel 1 and flows into the bores 8.

The delivery screw 2 comprises a central mandrel 10, on which a plurality of individual screw flight segments 11 are spring-mounted by means of adjustment springs 12. The mounting of the segments 11 is such that they are not rotatable with respect to the mandrel.

Rings 7 are also disposed on the mandrel 10 between these individual screw flight segments 11. Each pin 6 is tipped with a detachable tip portion 13.

The liquid extraction pins 6 project radially inwardly through the hollow barrel 1 to adjacent the rings 7 so that a separation gap 14 of the order of 0.1 to 0.8 mm is defined between the inner end face of the tip portion 13 and the ring 7 associated therewith.

Both the rings 7 and the tip portions 13 are formed from a sintered hard metal such as tungsten carbide or from an oxide ceramics material such as aluminium oxide or zinc oxide. Accordingly, the parts defining the separation gap 14 have been made both corrosion-resistant and wear-resistant in an extremely simple manner.

Immediately upstream of the liquid extraction pins 6, in the direction of flow of the mixture through the device denoted by the arrow 15, a very high pressure up to 500 bars subsists. The liquid components of the mixture are extracted from the mixture by this high pressure. The liquid flows around the pins 6 because a substantially lower pressure prevails on the downstream side of the pins 6.

From such downstream side, the liquid flows back to the pin heads, as shown by the arrow 16, into the separating gaps 14. Thereafter, the liquid flows into the axial bores 8 in the pins 6 and is conducted through the conduits 9 into a drainage system (not shown).

The pins 6 are combined to form individual pin planes. In the example shown each pin plane consists of eight pins 6 equiangularly distributed around the periphery of the barrel 1. However, the number of pins 6 in each plane may be varied as desired. The selection of the number of pins is dependent on the liquid content of the material from which liquid is to be extracted and upon the size of the extrusion device.

Due to the movement of the material in the screw threads and to the retarding effect of the pins 6, a pressure build-up occurs in the barrel and this causes the delivery output to be increased. Such increased output automatically leads to a considerable further pressure increase in the barrel 1 which may, for example, be of the order of 500 bars, particularly in the regions between the pin planes.

The greatest pressure is exerted upon the substance to be extruded in the pin-barrel region. Under such pressure, inter-cellular water in the material is extracted. Depending on the material being treated, a dry-substance content of up to 90% can be continuously achieved in a single operation.

The most essential pre-requisite for achieving a high degree of liquid extraction from a solid-liquid mixture resides in the provision of the axial discharge bores 8 in the pins 6, with the liquid extraction separation gaps 14 being formed between the rounded tips or heads of the pins 6 and the core of the screw. The pin bores 8 permit the extracted liquid to be removed and discharged at the location where the liquid is extracted from the mixture. In this connection, it should be pointed out that the extracted liquid should be removed and discharged at, if possible, the extraction point so as to prevent the liquid from re-mixing with the solid components to any appreciable extent.

More particularly, however, the liquid extraction separation gaps 14 permit the released inter-cellular water to be discharged without causing an appreciable pressure drop in the pin-barrel region. This is important because a large build-up of pressure is necessary to permit the inter-cellular water to be extracted efficiently and for a high dry substance contents to be attained.

Figure 4:
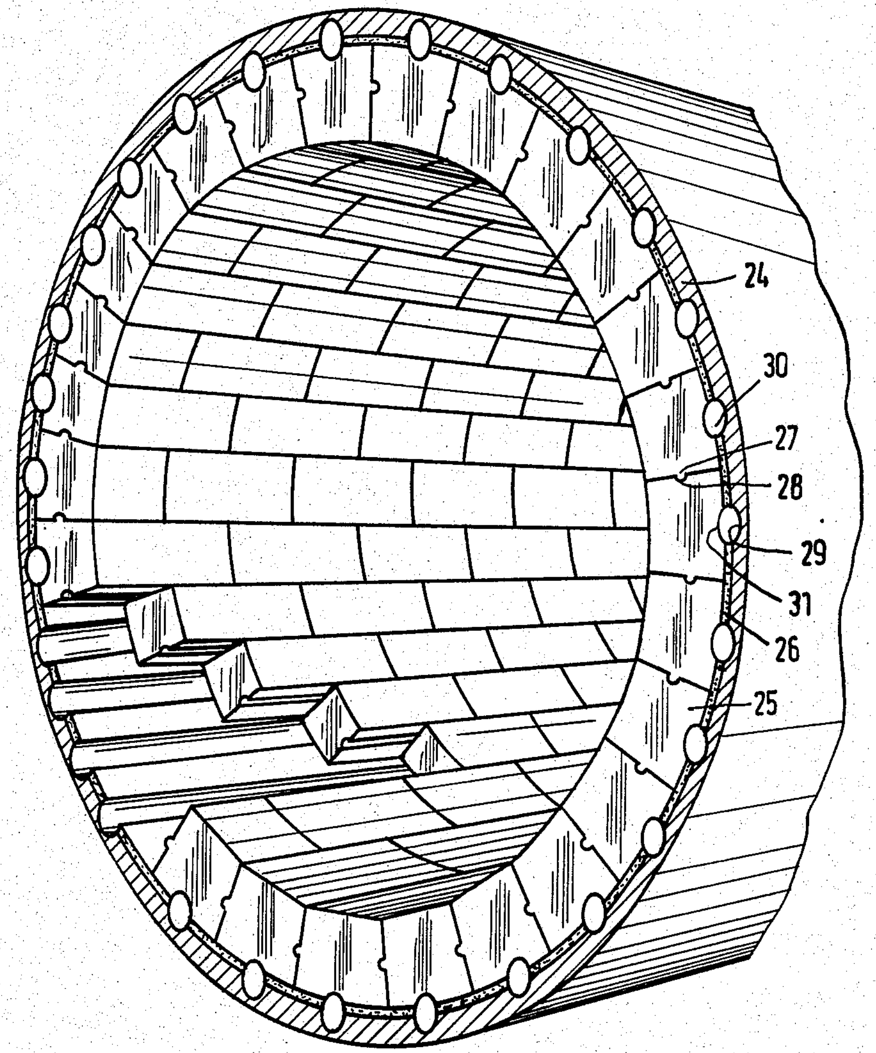
FIG. 4 is a perspective view of a lined barrel forming part of the device shown in FIG. 1.

As shown in FIG. 4, the barrel 1 comprises an outer metal cylinder 24 which is lined with individual ceramic segments 25.

Semi-circular, axially extending grooves 29 are formed in the internal surface of the metal cylinder 24 and a corresponding semi-circular axially extending groove 31 is formed in one face of each segment 25. When the segments are correctly positioned with respect to the metal sleeve, the grooves lie opposite one another and define a series of axially extending channels which are circular in cross-section. Into each of these channels, a circular section rod or bar 30 is inserted. On one of the faces adjacent the face provided with the groove 31, each segment is provided with a further axially extending groove 27 which is also semi-circular in cross-section. On its face opposite the face carrying the groove 27, each segment carries an axially extending projection portion 28 which is semi-circular in cross-section.

Additionally, a layer 26 of an adhesive may be used to join the segments 25 to the metal cylinder 24. This layer is initially applied between the segments 25 and the metal cylinder 24. Each of the individual segments 25 is then pressed into the layer of adhesive by holding the semi-circular, lateral groove 27 and the semi-circular projection portion 28 thereof. The projection 28 and the groove 27 also engage with the respective groove 27 and projection portion 28 respectively of adjacent segments 25 so that adjacent segments 25 are keyed together.

Thus the barrel 1 can be lined effectively and in such a manner as to be virtually wear-resistant.

We claim:

1. In an extrusion device for separating liquids from liquid-solid mixtures, comprising a hollow barrel, said barrel having first and second opposed end regions and an internal surface, feed means for said liquid-solid mixture located in said first end region, discharge outlet means for material having had liquid extracted therefrom in said second end region, a screw rotatable in said hollow interior of said barrel, said screw including a core portion, at least one flight helically disposed around said core of said screw, said at least one flight being discontinuous, pin members projecting radially inwardly into said hollow interior of said barrel intermediate said end regions, said discontinuous portions of said at least one flight on said screw being so dimensioned as to permit said screw to rotate past said pins, each of said pins including an inner tip portion located adjacent said core of said screw, said pins and said core of said screw jointly defining separation gaps, said gaps in use, being substantially self-cleaning, each said retaining pin defining an internal axial discharge bore for removing liquid extracted from said mixture from said barrel and a drainage or discharge system in fluid flow communication with said discharge bores, the improvements comprising lining means disposed adjacent said internal surface of said barrel, said lining means comprising a plurality of segments, said segments being disposed relative to one another in the form of a wall; an end face portion detachably affixed to said tip portion of each said pin, each said end face portion defining an axial bore, said axial bore in said end face portion being aligned with said axial bore in said pin; and said screw comprises a mandrel, a plurality of screw flight portions mounted on said mandrel, said screw flight portions being axially spaced apart, and at least one ring member, said ring member being spring-mounted on said mandrel and being disposed between adjacent ones of said flight portions, said ring portions defining said core of said screw and forming said discontinuous portions of said flight, said separation gaps being defined between said end face portions mounted on said pins and said ring portions mounted on said mandrel.

2. A screw press as recited in claim 1, in which said ceramic segments forming said lining on said internal surface of the barrel are substantially rectangular in cross-section one face of each said segment defining a semi-circular groove, said grooved face, in use, lying adjacent said barrel, and in which said internal surface of said barrel defines a plurality of grooves, said plurality of grooves each being semi-circular in cross-section and extending axially along said barrel, said grooves in said segments and in said barrel being aligned with one another so as to define a plurality of axially extending channels which are substantially circular in cross-section, and circular section metal bars or rods located in said circular-section channels defined by said semi-circular grooves, said bars or rods preventing said segments from rotating with respect to said barrel.

3. An extrusion device as recited in claim 1 wherein said end face portions located on said pins and said ring portions forming said core of said screw are formed of a hard metal produced by sintering.

4. An extrusion device as recited in claim 3 wherein the sintered hard metal is tungsten carbide.

5. An extrusion device as recited in claim 1 wherein said end face portions located on said pins and said ring portions forming said core of said screw are formed of a ceramics material.

6. An extrusion device as recited in claim 2, wherein each said segment includes first and second opposed faces, said opposed faces each being disposed adjacent said face provided with said semi-circular groove, said first opposed face defining a further groove which is substantially semi-circular in cross-section, said groove extending longitudinally, said second opposed face carrying projection means, said projection means being hemispherical, said projection and said further groove co-operating with, respectively, said further groove and said projection of adjacent segments whereby said adjacent segments are keyed together.

7. An extrusion as recited in claim 1 in which said segments are formed from an aluminium oxide ceramics material.

8. An extrusion device as recited in claim 1 wherein a layer of adhesive is interposed between said internal surface of said barrel and said segments.

* * * * *